US009958138B2

(12) United States Patent
Salter et al.

(10) Patent No.: US 9,958,138 B2
(45) Date of Patent: *May 1, 2018

(54) VEHICLE TRIM ASSEMBLY

(71) Applicant: Ford Global Technologies, LLC, Dearborn, MI (US)

(72) Inventors: Stuart C. Salter, White Lake, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/712,956

(22) Filed: Sep. 22, 2017

(65) Prior Publication Data

US 2018/0010769 A1 Jan. 11, 2018

Related U.S. Application Data

(63) Continuation of application No. 14/604,807, filed on Jan. 26, 2015, now Pat. No. 9,810,401, which is a
(Continued)

(51) Int. Cl.
*B60Q 3/82* (2017.01)
*B60Q 3/80* (2017.01)
(Continued)

(52) U.S. Cl.
CPC .............. *F21V 9/30* (2018.02); *B60K 37/06* (2013.01); *B60Q 3/217* (2017.02); *B60Q 3/68* (2017.02);
(Continued)

(58) Field of Classification Search
CPC .......... B60Q 1/0023; B60Q 3/51; B60Q 3/68; B60Q 3/80; B60Q 3/82; B60Q 2500/10; B60Q 3/217; B60Q 3/54; H01H 2201/032; H01H 2205/03; H01H 2209/082; H01H 2215/004; H01H 2219/036; H01H 2219/046; H01H 2219/056; H01H 2219/06; H01H 9/182; H05B 33/26; H05B 33/28; F21K 9/00; F21K 9/238; F21V 23/005; F21V 3/04; F21V 9/06; G02F 1/133603
See application file for complete search history.

(56) References Cited

U.S. PATENT DOCUMENTS 2,486,859 A 11/1949 Meijer et al.
4,811,175 A * 3/1989 Desmet ................ H01H 13/702
200/313
(Continued)

FOREIGN PATENT DOCUMENTS

CN 101337492 A 1/2009
CN 201169230 Y 2/2009
(Continued)

*Primary Examiner* — Hargobind S Sawhney
(74) *Attorney, Agent, or Firm* — Vichit Chea; Price Heneveld LLP

(57) ABSTRACT

A trim assembly for a vehicle is provided herein. The trim assembly includes a substrate and a housing forming a cavity therebetween. A conductive layer is coupled to the housing and has first and second portions each including an electrically conductive material. The first portion is separated from the second portion by an electrically insulative gap.

20 Claims, 9 Drawing Sheets

Related U.S. Application Data continuation-in-part of application No. 14/086,442, filed on Nov. 21, 2013, now abandoned.

(51) Int. Cl.
  *B60Q 3/217* (2017.01)
  *B60Q 3/68* (2017.01)
  *F21V 9/16* (2006.01)
  *B60K 37/06* (2006.01)

(52) U.S. Cl.
  CPC ............... *B60Q 3/80* (2017.02); *B60Q 3/82* (2017.02); *F21V 9/16* (2013.01); *B60K 2350/1012* (2013.01)

(56) References Cited

U.S. PATENT DOCUMENTS

| | | | | |
|---|---|---|---|---|
| 5,053,930 | A | 10/1991 | Benavides | |
| 5,434,013 | A | 7/1995 | Fernandez | |
| 5,561,278 | A * | 10/1996 | Rutten | H01H 13/702 200/5 A |
| 5,709,453 | A | 1/1998 | Krent et al. | |
| 5,839,718 | A | 11/1998 | Hase et al. | |
| 5,871,088 | A * | 2/1999 | Tanabe | C09K 11/02 200/314 |
| 5,924,555 | A * | 7/1999 | Sadamori | H01H 13/7006 200/238 |
| 6,031,511 | A | 2/2000 | DeLuca et al. | |
| 6,072,391 | A * | 6/2000 | Suzuki | B60K 35/00 340/435 |
| 6,117,362 | A | 9/2000 | Yen et al. | |
| 6,234,648 | B1 | 5/2001 | Bonner et al. | |
| 6,373,008 | B1 * | 4/2002 | Saito | H01H 13/7006 200/310 |
| 6,419,854 | B1 | 7/2002 | Yocom et al. | |
| 6,494,490 | B1 | 12/2002 | Trantoul | |
| 6,577,073 | B2 | 6/2003 | Shimizu et al. | |
| 6,593,537 | B2 * | 7/2003 | Teruyama | H01H 13/7006 200/406 |
| 6,595,653 | B2 * | 7/2003 | Saito | H01H 13/7006 200/314 |
| 6,729,738 | B2 | 5/2004 | Thompson et al. | |
| 6,737,964 | B2 | 5/2004 | Samman et al. | |
| 6,773,129 | B2 | 8/2004 | Anderson, Jr. et al. | |
| 6,820,888 | B1 | 11/2004 | Griffin | |
| 6,841,804 | B1 | 1/2005 | Chen et al. | |
| 6,851,840 | B2 | 2/2005 | Ramamurthy et al. | |
| 6,859,148 | B2 | 2/2005 | Miller | |
| 6,871,986 | B2 | 3/2005 | Yamanaka et al. | |
| 6,917,007 | B2 * | 7/2005 | Hirai | H01H 13/7006 200/406 |
| 6,953,536 | B2 | 10/2005 | Yen et al. | |
| 6,990,922 | B2 | 1/2006 | Ichikawa et al. | |
| 7,015,408 | B2 * | 3/2006 | Hirahata | H01H 13/7006 200/310 |
| 7,015,893 | B2 | 3/2006 | Li et al. | |
| 7,040,774 | B2 | 5/2006 | Beeson et al. | |
| 7,064,288 | B2 * | 6/2006 | Nam | H01H 13/7006 200/314 |
| 7,129,435 | B2 * | 10/2006 | Sano | H01H 13/7006 200/341 |
| 7,161,472 | B2 | 1/2007 | Strumolo et al. | |
| 7,213,923 | B2 | 5/2007 | Liu et al. | |
| 7,216,997 | B2 | 5/2007 | Anderson, Jr. | |
| 7,249,869 | B2 | 7/2007 | Takahashi et al. | |
| 7,264,366 | B2 | 9/2007 | Hulse | |
| 7,264,367 | B2 | 9/2007 | Hulse | |
| 7,378,609 | B1 * | 5/2008 | Fedorjaka | H01H 13/705 200/406 |
| 7,399,937 | B2 * | 7/2008 | Nishimura | H01H 13/83 200/314 |
| 7,404,655 | B2 | 7/2008 | Walser et al. | |
| 7,441,914 | B2 | 10/2008 | Palmer et al. | |
| 7,501,749 | B2 | 3/2009 | Takeda et al. | |
| 7,575,349 | B2 | 8/2009 | Bucher et al. | |
| 7,635,212 | B2 | 12/2009 | Seidler | |
| 7,687,735 | B2 * | 3/2010 | Chien | H01H 13/705 200/406 |
| 7,726,856 | B2 | 6/2010 | Tsutsumi | |
| 7,745,818 | B2 | 6/2010 | Sofue et al. | |
| 7,753,541 | B2 | 7/2010 | Chen et al. | |
| 7,834,548 | B2 | 11/2010 | Jousse et al. | |
| 7,862,220 | B2 | 1/2011 | Cannon et al. | |
| 7,888,613 | B2 * | 2/2011 | Jeffery | H01H 13/83 200/314 |
| 7,923,653 | B2 * | 4/2011 | Ohsumi | H01H 13/88 200/512 |
| 7,987,030 | B2 | 7/2011 | Flores et al. | |
| 8,016,465 | B2 | 9/2011 | Egerer et al. | |
| 8,022,818 | B2 | 9/2011 | la Tendresse et al. | |
| 8,044,415 | B2 | 10/2011 | Messere et al. | |
| 8,066,416 | B2 | 11/2011 | Bucher | |
| 8,071,988 | B2 | 12/2011 | Lee et al. | |
| 8,097,843 | B2 | 1/2012 | Agrawal et al. | |
| 8,118,441 | B2 | 2/2012 | Hessling | |
| 8,120,236 | B2 | 2/2012 | Auday et al. | |
| 8,136,425 | B2 | 3/2012 | Bostick | |
| 8,163,201 | B2 | 4/2012 | Agrawal et al. | |
| 8,164,014 | B2 * | 4/2012 | Tatehata | H01H 13/83 200/310 |
| 8,169,131 | B2 | 5/2012 | Murazaki et al. | |
| 8,178,852 | B2 | 5/2012 | Kingsley et al. | |
| 8,197,105 | B2 | 6/2012 | Yang | |
| 8,203,260 | B2 | 6/2012 | Li et al. | |
| 8,207,511 | B2 | 6/2012 | Bortz et al. | |
| 8,232,533 | B2 | 7/2012 | Kingsley et al. | |
| 8,247,761 | B1 | 8/2012 | Agrawal et al. | |
| 8,261,686 | B2 | 9/2012 | Birman et al. | |
| 8,286,378 | B2 | 10/2012 | Martin et al. | |
| 8,382,189 | B2 | 2/2013 | Li et al. | |
| 8,408,766 | B2 | 4/2013 | Wilson et al. | |
| 8,415,642 | B2 | 4/2013 | Kingsley et al. | |
| 8,421,811 | B2 | 4/2013 | Odland et al. | |
| 8,466,438 | B2 | 6/2013 | Lambert et al. | |
| 8,519,359 | B2 | 8/2013 | Kingsley et al. | |
| 8,519,362 | B2 | 8/2013 | Labrot et al. | |
| 8,539,702 | B2 | 9/2013 | Li et al. | |
| 8,552,848 | B2 | 10/2013 | Rao et al. | |
| 8,606,430 | B2 | 12/2013 | Seder et al. | |
| 8,624,716 | B2 | 1/2014 | Englander | |
| 8,631,598 | B2 | 1/2014 | Li et al. | |
| 8,664,624 | B2 | 3/2014 | Kingsley et al. | |
| 8,683,722 | B1 | 4/2014 | Cowan | |
| 8,724,054 | B2 | 5/2014 | Jones | |
| 8,754,426 | B2 | 6/2014 | Marx et al. | |
| 8,773,012 | B2 | 7/2014 | Ryu et al. | |
| 8,846,184 | B2 | 9/2014 | Agrawal et al. | |
| 8,847,481 | B2 | 9/2014 | Park et al. | |
| 8,851,694 | B2 | 10/2014 | Harada | |
| 8,876,352 | B2 | 11/2014 | Robbins et al. | |
| 8,952,341 | B2 | 2/2015 | Kingsley et al. | |
| 8,994,495 | B2 | 3/2015 | Dassanayake et al. | |
| 9,006,751 | B2 | 4/2015 | Kleo et al. | |
| 9,018,833 | B2 | 4/2015 | Lowenthan et al. | |
| 9,057,021 | B2 | 6/2015 | Kingsley et al. | |
| 9,059,378 | B2 | 6/2015 | Verger et al. | |
| 9,065,447 | B2 | 6/2015 | Buttolo et al. | |
| 9,187,034 | B2 | 11/2015 | Tarahomi et al. | |
| 9,299,887 | B2 | 3/2016 | Lowenthal et al. | |
| 9,315,148 | B2 | 4/2016 | Schwenke et al. | |
| 9,568,659 | B2 | 2/2017 | Verger et al. | |
| 9,616,812 | B2 | 4/2017 | Sawayanagi | |
| 2002/0159741 | A1 | 10/2002 | Graves et al. | |
| 2002/0163792 | A1 | 11/2002 | Formosa | |
| 2003/0167668 | A1 | 9/2003 | Fuks et al. | |
| 2003/0179548 | A1 | 9/2003 | Becker et al. | |
| 2004/0213088 | A1 | 10/2004 | Fuwausa | |
| 2005/0084229 | A1 | 4/2005 | Babbitt et al. | |
| 2005/0189795 | A1 | 9/2005 | Roessler | |
| 2006/0087826 | A1 | 4/2006 | Anderson, Jr. | |
| 2006/0097121 | A1 | 5/2006 | Fugate | |
| 2007/0006493 | A1 | 1/2007 | Eberwein | |

(56) References Cited

U.S. PATENT DOCUMENTS

| | | |
|---|---|---|
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0166653 A1 | 7/2009 | Weaver, Jr. et al. |
| 2009/0217970 A1 | 9/2009 | Zimmerman et al. |
| 2009/0219730 A1 | 9/2009 | Syfert et al. |
| 2009/0242374 A1* | 10/2009 | Ohsumi ............ H01H 13/88 200/5 A |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2010/0321919 A1 | 12/2010 | Yang |
| 2011/0002138 A1 | 1/2011 | Hayes et al. |
| 2011/0012062 A1 | 1/2011 | Agrawal et al. |
| 2011/0249433 A1 | 10/2011 | Harbers et al. |
| 2012/0001406 A1 | 1/2012 | Paxton et al. |
| 2012/0104954 A1 | 5/2012 | Huang |
| 2012/0106128 A1 | 5/2012 | Massara et al. |
| 2012/0133169 A1 | 5/2012 | George et al. |
| 2012/0183677 A1 | 7/2012 | Agrawal et al. |
| 2012/0279843 A1 | 11/2012 | Wippler |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

VEHICLE TRIM ASSEMBLY

CROSS-REFERENCE TO RELATED APPLICATION

This application is a continuation of U.S. patent application Ser. No. 14/604,807, filed Jan. 26, 2015, and entitled "LUMINESCENT TRIM LIGHT ASSEMBLY," which is a continuation-in-part of U.S. patent application Ser. No. 14/086,442, filed Nov. 21, 2013, and entitled "VEHICLE LUMINESCENT LIGHT ASSEMBLY WITH PHOTOLUMINESCENT STRUCTURE," the entire disclosures of each is incorporated herein by reference.

FIELD OF THE INVENTION

The present invention generally relates to vehicle luminescent light assemblies, and more particularly, to vehicle luminescent light assemblies employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide quality lighting assemblies.

SUMMARY OF THE INVENTION

According to one aspect of the present disclosure, a trim assembly for a vehicle is disclosed. The trim assembly includes a substrate and a housing forming a cavity therebetween. A conductive layer is coupled to the housing and has first and second portions each including an electrically conductive material. The first portion is separated from the second portion by an electrically insulative gap.

According to another aspect of the present disclosure, a trim assembly for a vehicle is disclosed. The assembly includes a housing having a layer thereon having first and second portions each formed with an electrically conductive material and separated by an electrically insulative gap. A conductive interconnect is disposed between a substrate and the housing. The interconnect supplies electrical power to each conductive material on the housing. A light source is disposed between the substrate and housing.

According to another aspect of the present disclosure, a trim assembly for a vehicle is disclosed. The trim assembly includes a substrate coupled to a housing. The housing has a conductive layer thereon that includes first and second portions separated by an electrically insulative gap. A conductive interconnect is disposed between the substrate and the housing. The interconnect supplies electrical power to the conductive layer on the housing.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

Figure 2:
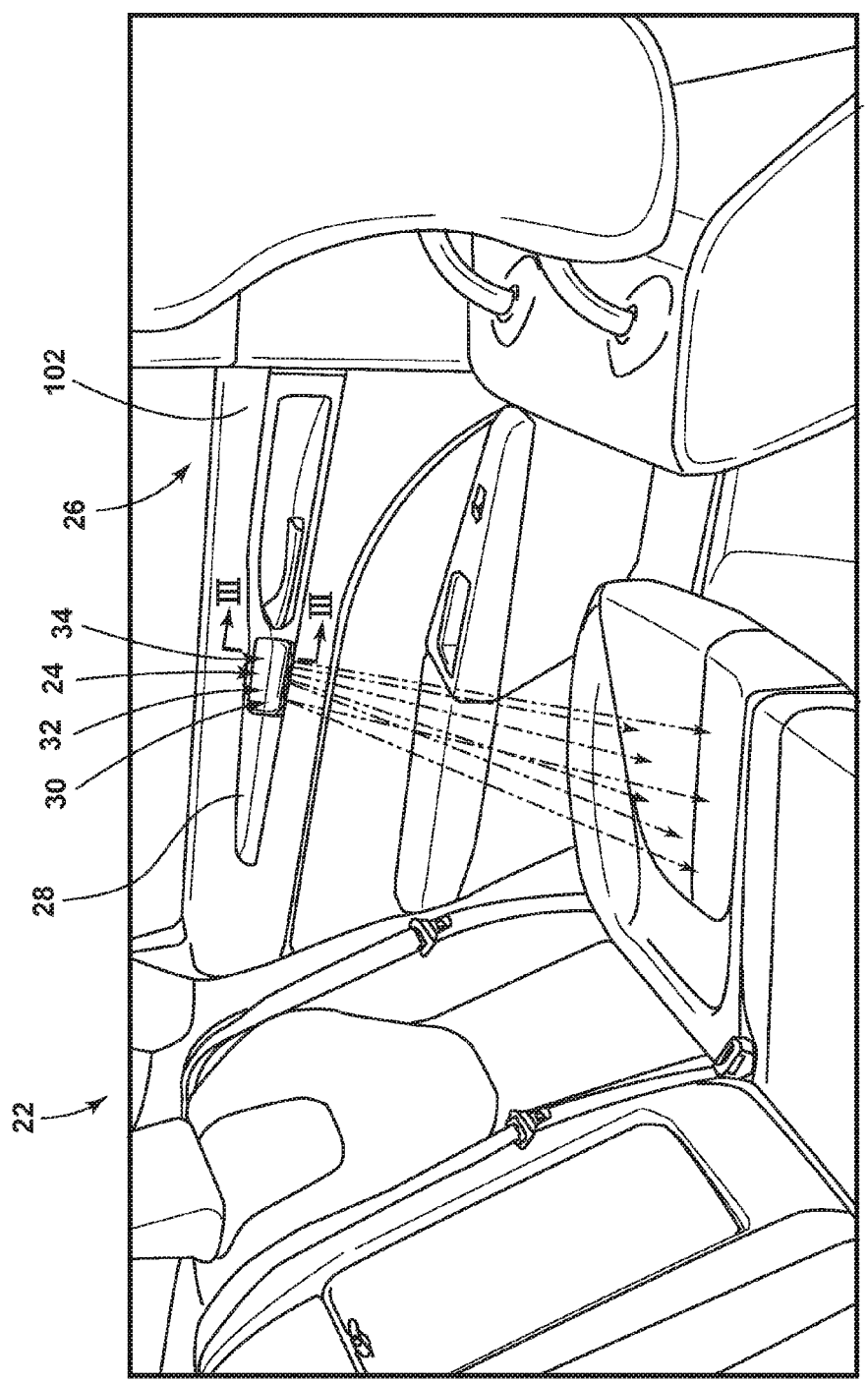
FIG. 2 is an exemplary view of the interior of a vehicle having a luminescent trim light assembly disposed therein.

For purposes of description herein, the terms "upper," "lower," "right," "left," "rear," "front," "vertical," "horizontal," "interior," "exterior," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

The following disclosure describes a luminescent trim light assembly that advantageously employs one or more photoluminescent structures configured to convert light received from an associated light source and re-emit the light at a different wavelength.

Figure 1A:
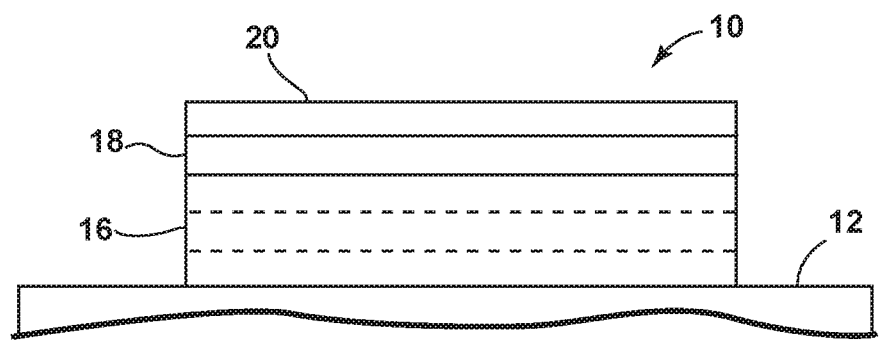
FIG. 1A is a side view of a photoluminescent structure rendered as a coating for use in a photoluminescent trim light assembly according to some examples.
Figure 1B:
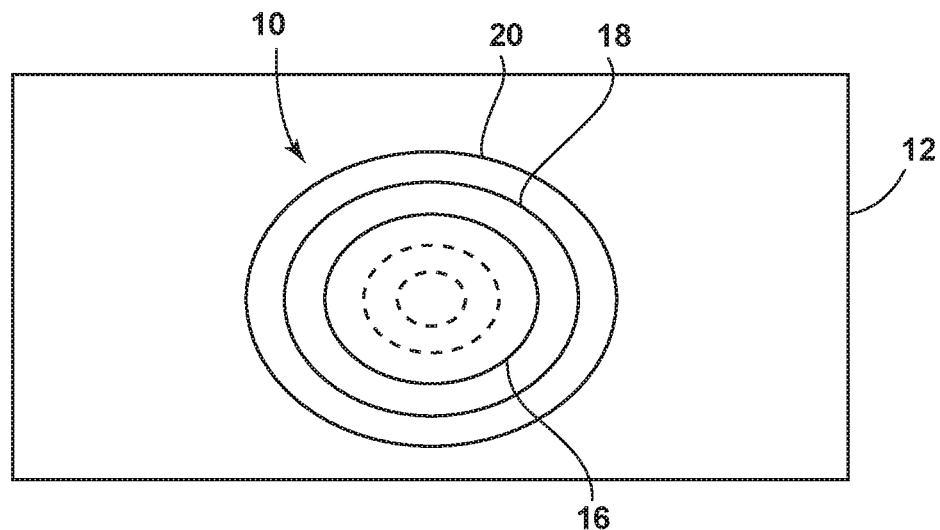
FIG. 1B is a top view of a photoluminescent structure rendered as a discrete particle according to some examples.
Figure 1C:
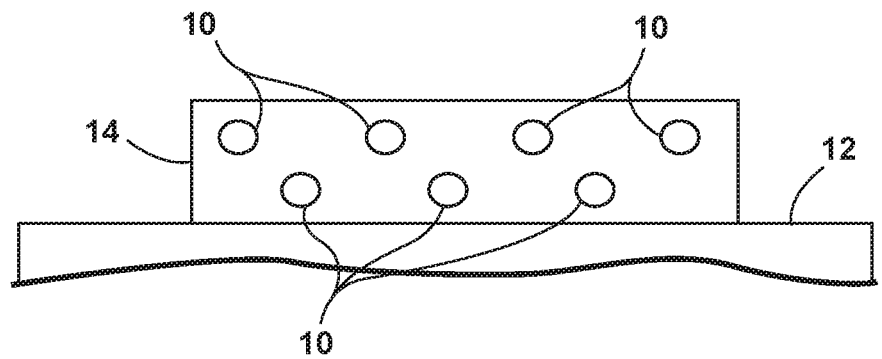
FIG. 1C is a side view a plurality photoluminescent structures rendered as discrete particles and incorporated into a separate structure.
Figure 3:
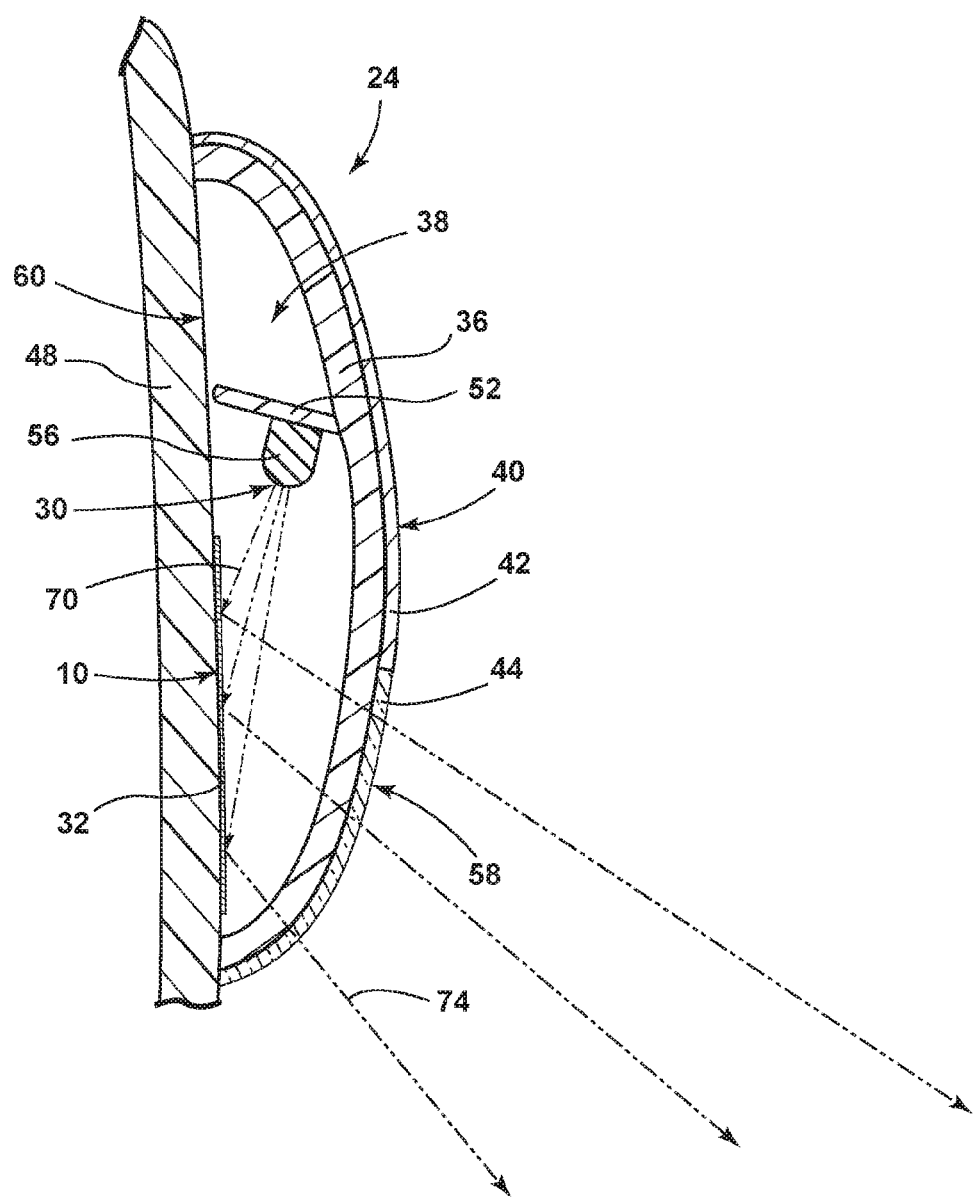
FIG. 3 illustrates a cross-sectional view of the luminescent trim light assembly taken along the line III-III of FIG. 2 having an outer layer disposed on a housing.

Referring to FIGS. 1A-1C, various exemplary embodiments of photoluminescent structures 10 are shown, each capable of being implemented within a trim light assembly 24 (FIG. 2). In FIG. 1A, the photoluminescent structure 10 is generally shown rendered as a support medium 14 (e.g., a film) that may be applied to a surface of the support member 12, such as a substrate 48 (FIG. 3). In FIG. 1B, the photoluminescent structure 10 is generally shown as a discrete particle capable of being integrated with a support member 12. In FIG. 1C, the photoluminescent structure 10 is generally shown as a plurality of discrete particles that may be incorporated into a support medium 14 (e.g., a film) that may then be applied (as shown) or integrated with the support member 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials having energy converting elements with phosphorescent or fluorescent properties. Each photoluminescent material may become excited upon receiving light of a specific wavelength, thereby causing the light to undergo a conversion process resulting in luminescence of the photoluminescent material. Under the principle of down conversion, the inputted light is converted into a longer wavelength light that is outputted from the photoluminescent structure 10. Conversely, under the principle of up conversion, the inputted light is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

In some embodiments, light that has been down converted or up converted may be used to excite other photoluminescent material(s) found in the energy conversion layer 16. The process of using converted light outputted from one photoluminescent material to excite another, and so on, is generally known as an energy cascade and may serve as an alternative for achieving various color expressions. With respect to either conversion principle, the difference in wavelength between the exciting light and the converted light is known as the Stokes shift and serves as the principal driving mechanism for an energy conversion process corresponding to a change in wavelength of light. In the various embodiments discussed herein, each of the photoluminescent structures 10 may operate under either conversion principle.

The energy conversion layer 16 may be prepared by dispersing the photoluminescent material in a polymer matrix to form a homogenous mixture using a variety of methods. Such methods may include preparing the energy conversion layer 16 from a formulation in a liquid carrier medium and coating the energy conversion layer 16 to a desired support member 12. The energy conversion layer 16 may be applied to a support member 12 by painting, screen printing, spraying, slot coating, dip coating, roller coating, and bar coating. Alternatively, the energy conversion layer 16 may be prepared by methods that do not use a liquid carrier medium. For example, the energy conversion layer 16 may be rendered by dispersing the photoluminescent material into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a support member 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively, the energy conversion layer 16 may be formed by coextruding the sublayers.

Referring back to FIGS. 1A and 1B, the photoluminescent structure 10 may optionally include at least one stability layer 18 to protect the photoluminescent material contained within the energy conversion layer 16 from photolytic and thermal degradation. The stability layer 18 may be configured as a separate layer optically coupled and adhered to the energy conversion layer 16. Alternatively, the stability layer 18 may be integrated with the energy conversion layer 16. The photoluminescent structure 10 may also optionally include a protection layer 20 optically coupled and adhered to the stability layer 18 or other layer (e.g., the conversion layer 16 in the absence of the stability layer 18) to protect the photoluminescent structure 10 from physical and chemical damage arising from environmental exposure. The stability layer 18 and/or the protective layer 20 may be combined with the energy conversion layer 16 through sequential coating or printing of each layer, sequential lamination or embossing, or any other suitable means.

Referring to FIG. 2, a vehicle 22 is shown having a trim light assembly 24 located within the interior cabin 26 of the vehicle 22. The trim light assembly 24 is integrally formed with or generally disposed proximate a trim assembly 28 of the vehicle 22. In the exemplary embodiment shown, the interior trim assembly 28 forms an insert for a door trim panel 102. In some examples, the door trim assembly 28 is mounted to an inner panel of the vehicle door as illustrated in FIG. 2. It should also be appreciated that the trim light assembly 24 may be an assembly mounted to other panels of the vehicle 22. The door trim assembly 28 includes a substrate 48 extending longitudinally and vertically and having a generally rectangular shape. The substrate 48 has an internal surface 60 and an outer side. The outer side is attached to the inner panel of the door by suitable means such as fasteners (not shown).

The trim light assembly 24 may also function as a styling element that is used to enhance the appearance of the vehicle 22 and includes a light source 30 and a luminescent portion 32. The luminescent portion 32 includes at least one photoluminescent structure 10 therein. For instance, each trim light assembly 24 may have a portion that illuminates in first and second colors. When the vehicle 22 is in a first state, the trim light assembly 24 provides outward glow in a first color. When the vehicle 22 is in a second state, the trim light assembly 24 may appear as a second color. Through the use of photoluminescent structures 10, each color may appear uniform along a portion of the body of the trim light assembly 24. The contrast in substantially uniform lighting between the different states imparts a distinct styling element to the trim light assembly 24. While a trim light assembly 24 for use within a vehicle 22 cabin has been described herein, it should be understood that light assemblies in other locations of the vehicle 22 may be similarly configured.

Referring to FIG. 3, cross section III-III of FIG. 2 illustrating a trim light assembly 24 is shown according to some examples. The trim light assembly 24 includes a substrate 48, which may form a portion of a trim assembly 28 (FIG. 2) and may be made of any practicable material, such as a polymer. Exemplary materials include acrylonitrile-butadiene-styrene (ABS), polypropylene (PP), thermoplastic olefin (TPO), styrene block co-polymer (SEBS), thermoplastic polyurethane (TPU), polyethylene terephthalate (PET), or the like. A housing 36 is attached to the substrate 48 creating an aesthetically pleasing three-dimensional component within the vehicle 22, and a cavity 38 therebetween. The housing 36 may be embodied in a one-piece tubular configuration that may be later assembled to the substrate 48 via any adhesion process, such as sonic or laser welding. Alternatively, the housing 36 and substrate 48 may be assembled as a single piece through any known process, such as low-pressure insert molding. In the illustrated embodiment, the housing 36 is an outward component of the assembly that is substantially visible after the assembly has been mounted on a vehicle 22.

Figure 7:
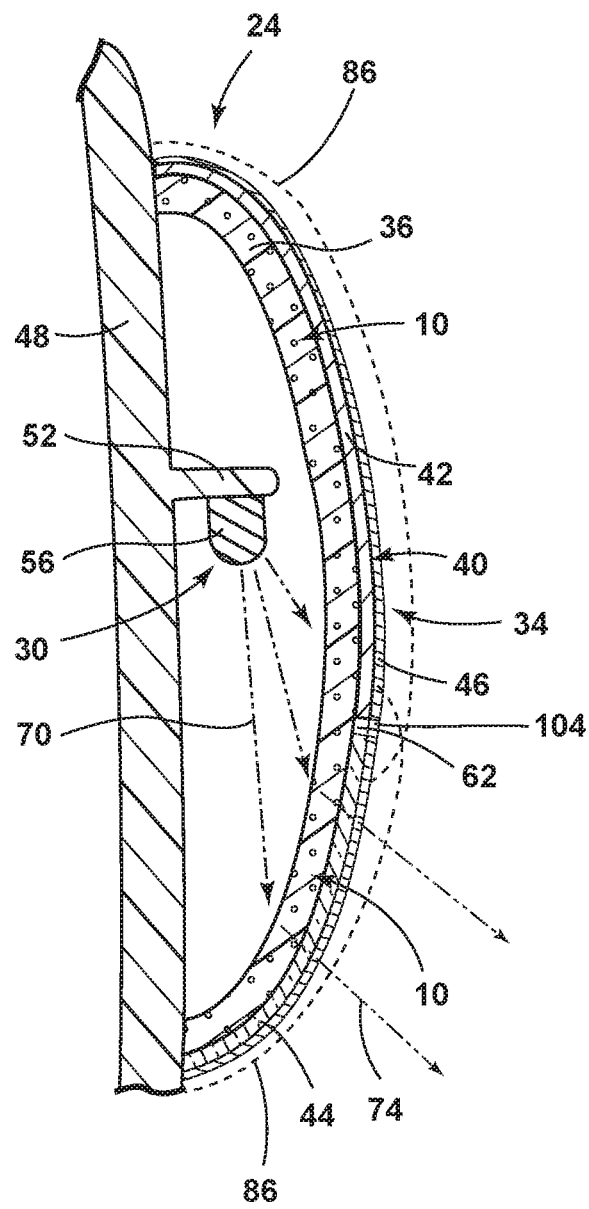
FIG. 7 illustrates a cross-sectional view of an alternate embodiment of a vehicle luminescent trim light assembly taken along line III-III of FIG. 2 having an outer layer disposed on a housing and a protective material disposed on the outer layer.

The trim light assembly 24 may also include an outer layer 40 made from any desired material. Portions of the outer layer 40 that are readily visible may be colored any color or may be metalized to give the trim light assembly 24 a metallic appearance. In some examples, an outer layer 40 is applied to an outward portion of the housing 36. The outer layer 40 may contain a plurality of portions of differing amounts of opacity, which is the measure of impenetrability to visible light through a material. An opaque object is neither transparent (allowing substantially all light to pass through) nor translucent (allowing some light to pass through). In the illustrated embodiment, the outer layer 40 includes a first portion 42 with a metallic material applied thereto via electroplating a thin layer of a metallic material thereon. The first portion 42 of the outer layer 40 is substantially opaque. A second portion 44 of the outer layer 40 includes a metallic material and is transparent and/or translucent to allow light to pass therethrough from an inner side to an outer side of the housing 36. The housing 36 and/or outer layer 40 may be of any practicable shape and material that assist in directing light from within the trim light assembly 24 to a desired target location. For example, the second portion 44 may act as a lens in some embodiments. Alternate processes may be used for coloring or layering material onto a portion of the housing 36, as is known in the art. Additional layers may further be applied to the housing 36 and/or outer layer 40, such as, but not limited to, a housing 36 and/or outer layer 40 and the protective layer 46 (FIG. 7). In alternate embodiments, the housing 36 may include the outer layer 40 integrally formed with a protective layer 46, or the outer layer 40 and housing 36 may be integrally formed as a single component.

The trim light assembly 24 includes a luminescent portion 32 including a photoluminescent structure 10. The luminescent portion 32 is coupled to the substrate 48, and optionally, some or all of the housing 36. The luminescent portion 32 at least partially covers the internal surface 60 of the substrate 48 and may be applied as a single continuous structure or multiple structures. Any remaining portions of the trim light assembly 24 may be covered by a light reflecting material 50 (FIG. 4), as described herein. In an alternative embodiment, the luminescent portion 32 may be molded or otherwise directly integrated into the substrate 48, housing 36, and/or any other component of the trim light assembly 24.

Referring still to FIG. 3, the trim light assembly 24 may further include a printed circuit board (PCB) 52 that is disposed between the substrate 48 and the housing 36. The PCB 52 may be secured to the substrate 48 or the housing 36 at any angle such that a light source 30 disposed on the PCB 52 is positioned towards a desired target location. The light source 30 may be powered by a vehicle power supply 54 (FIG. 9) or other power supply. The light source 30 may be disposed on any side of the PCB 52. A white solder mask (not shown) may be applied to the PCB 52 to reflect light incident thereon.

The light source 30 may be configured to emit non-focused light that excites a substantial portion of the photoluminescent structure 10. The light source 30 may be configured as one or more of various light types, such as, but not limited to, halogen lights, fluorescent lights, light emitting diodes (LEDs), organic LEDs (OLEDs), and polymer LEDs (PLEDs). In some examples, an LED 56 may be disposed on a first side of the PCB 52 and oriented to face towards the luminescent portion 32.

In operation, portions of the substrate 48 that are covered by the photoluminescent structure 10 may be configured to luminesce in response to excitation by light emitted from light source 30. Specifically, the photoluminescent structure 10 may be configured to perform an energy conversion on light emitted from light source 30. According to some examples, the photoluminescent structure 10 is configured to down convert light received from light source 30 to a new light of a longer wavelength. The light source 30 may be an LED 56 configured to emit ultraviolet light (~10-400 nanometers in wavelength), violet light (~380-450 nanometers in wavelength), or blue light (~450-495 nanometers in wavelength) to take advantage of the relatively low cost that is attributed to those types of LEDs. The converted light emitted from the photoluminescent structure 10 may correspond to a visible light, which includes the portion of the electromagnetic spectrum that can be detected by the human eye (~390-700 nanometers in wavelength) and may be expressed in a variety of colors defined by a single wavelength (e.g. red, green, blue) or a mixture of multiple wavelengths (e.g. white). Thus, it should be understood that the photoluminescent structure 10 may be configured such that converted light emitted therefrom is expressed as uni-colored or multi-colored light. For instance, the photoluminescent structure 10 may be configured to convert light emitted from light source 30 into white light, which may provide a cost effective alternative to using white LEDs.

According to some examples, the photoluminescent structure 10 is substantially Lambertian, that is, the apparent brightness of the photoluminescent structure 10 is substantially constant regardless of an observer's angle of view. As a consequence, converted light may be emitted outwardly from the photoluminescent structure 10 in numerous directions. With respect to the embodiment shown in FIG. 3, a portion of the converted light may be transmitted through the housing 36 and substantially transparent portions 58 of the outer layer 40, thereby causing those portions to exhibit luminescence.

Figure 4:
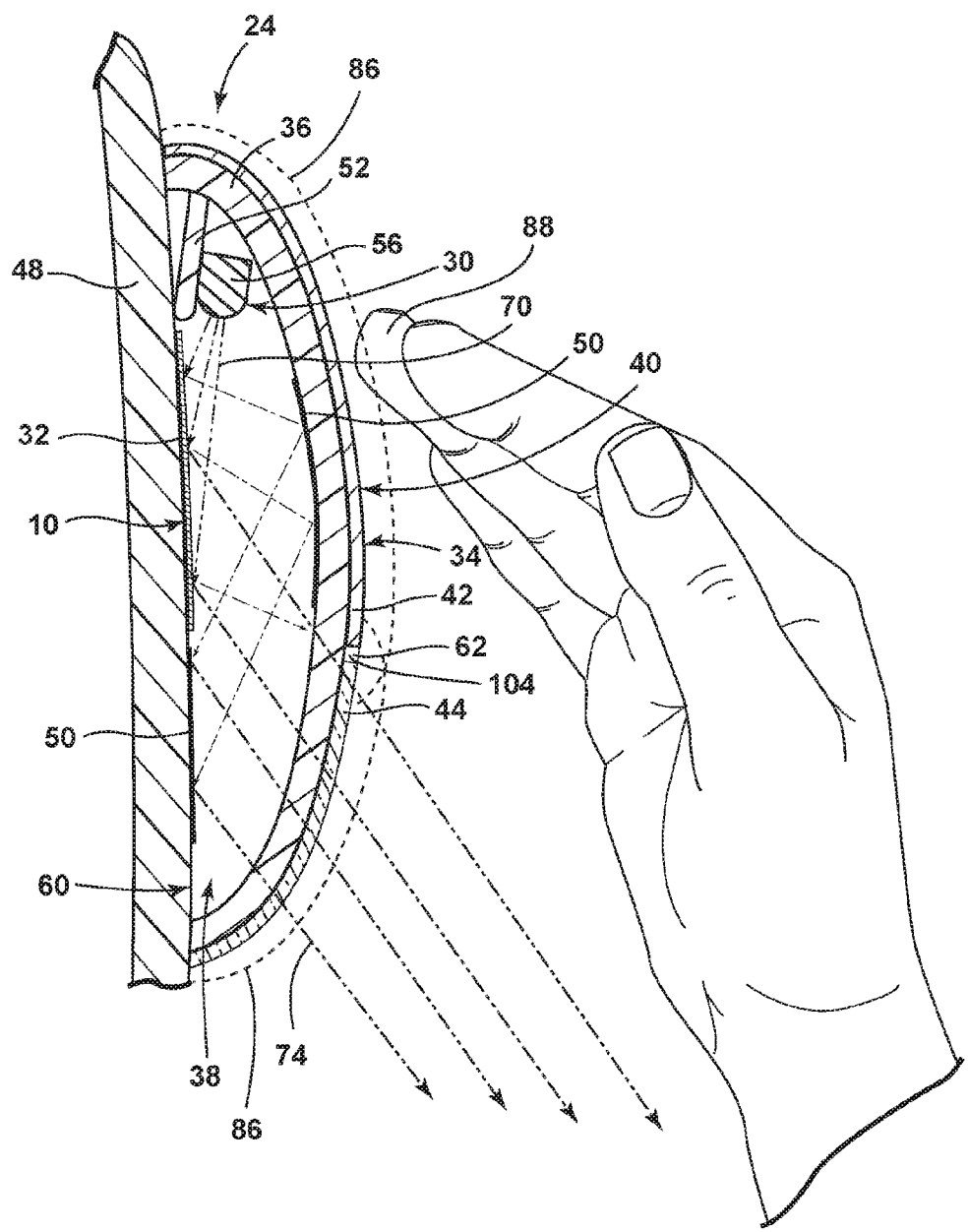
FIG. 4 illustrates a cross-sectional view of an alternate embodiment of a vehicle luminescent trim light assembly taken along line III-III of FIG. 2 having an outer layer and a reflective material disposed on an interior surface of the housing and a hand interfacing therewith.

Referring to FIG. 4, cross section of FIG. 2 illustrating an alternate embodiment of a trim light assembly 24 is shown having a PCB 52 that is encapsulated by the substrate 48 and the housing 36. The PCB 52 is attached to the housing 36 at a location proximate the substrate 48. The trim light assembly 24 also includes an LED 56 disposed on the PCB 52 that is directed towards an internal surface 60 of the substrate 48.

The LED 56 is configured to produce light at a first wavelength 70. The internal surface 60 of the substrate 48 has a luminescent portion 32 configured to convert light at a first wavelength 70 to a second wavelength 74. The luminescent portion 32 may be of any thickness and may vary in thickness such that the light at the second wavelength 74 is directed towards a desired direction.

The trim light assembly 24, in the illustrated embodiment, also includes an outer layer 40 having a first portion 42 and a second portion 44 separated by a gap 62. The gap 62 may be a hollow void or may be filled with any desired material 104, such as an electrically insulative material (i.e., dielectric). The first and second portions 42, 44 of the outer layer 40, in the illustrated embodiment, each contain an electrically conductive material. The first portion 42 of the outer layer 40 is substantially opaque to light. Conversely, the second portion 44 of the outer layer 40 is substantially transparent and/or translucent such that light from the LED 56 and/or photoluminescent structure 10 may penetrate the housing 36 and corresponding substantially transparent portion 58 of the outer layer 40 to direct light towards a desired location.

Another portion of the converted light may be emitted within the cavity 38 created between the substrate 48 and housing 36 and may eventually be redirected back toward the photoluminescent structure 10 by either the reflective material 50, a reflective layer, or a white solder mask on the first side of the PCB 52 before finally being outputted from the substantially transparent portion 58 of the housing 36. This may help to ensure that an optimal amount of converted light is outputted from the trim light assembly 24. Furthermore, the provision of the reflective material 50 and the white solder mask on the PCB 52 also helps to ensure that an optimal amount of light emitted from light source 30 reaches the photoluminescent structure 10. For example, it is possible for a portion of the light emitted from light source 30 to reflect off the photoluminescent structure 10, thereby resulting in decreased excitation of the photoluminescent structure 10. Thus, by providing a means to redirect this light back toward the photoluminescent structure 10, wayward propagating light originating from light source 30 and contained within the cavity 38 is given another opportunity to excite the photoluminescent structure 10.

The trim light assembly 24 may further comprise a proximity sensor 34 that may be operable to actuate a control output. In some embodiments, the sensor 34 is a single or a plurality of proximity sensors. Each of the sensors may be configured to control at least one control output corresponding to a system or a device of the vehicle 22. In some embodiments, the proximity sensors may be implemented as capacitive sensors. However, it should be appreciated by those skilled in the art that other types of proximity sensors may be used in addition to and/or alternatively to any other practicable sensor. Other embodiments of the proximity sensors may include but are not limited to, magnetic sensors, inductive sensors, optical sensors, resistive sensors, temperature sensors, the like, or any combination thereof.

Capacitive sensors detect changes in capacitance due to the placement or movement of an object such as a finger 88, or hand, proximate to or in contact with the sensor 34. The user's finger 88 may tap or swipe on or near the sensor 34 to input a switching event. The sensor 34 may be formed by the first and second portions 42, 44 of the conductive outer layer 40. Capacitive sensors may be actuatable with substantially no force to realize switch activation. The actual sensitivity of this type of switch can be tuned via a detection circuit. Capacitive switches beneficially provide immunity to interference and eliminate the need for electromechanical switch gear (e.g., push buttons or sliding switches).

Referring still to FIG. 4, the proximity sensor 34 controls a switch function that is integrated into the outer layer 40 by the application of touching the outer layer 40 at a targeted location (e.g., capacitive touch sense switch, etc.). The first and/or second portions 42, 44 of the outer layer 40 include a conductive material, or electrodes, thereby forming a capacitive sensor 34 that is embedded within the trim light assembly 24. The capacitive sensor 34 transmits a signal to a controller 64 (FIG. 9) to perform an operation (e.g., light on/off, etc.). Alternatively, the sensor 34 may be embedded in the first and/or second portion 42, 44 of the outer layer 40. The sensor 34 of this example is a touch sensitive transmitter that may be activated by, for example, a finger-touch to transmit a signal.

Figure 5:
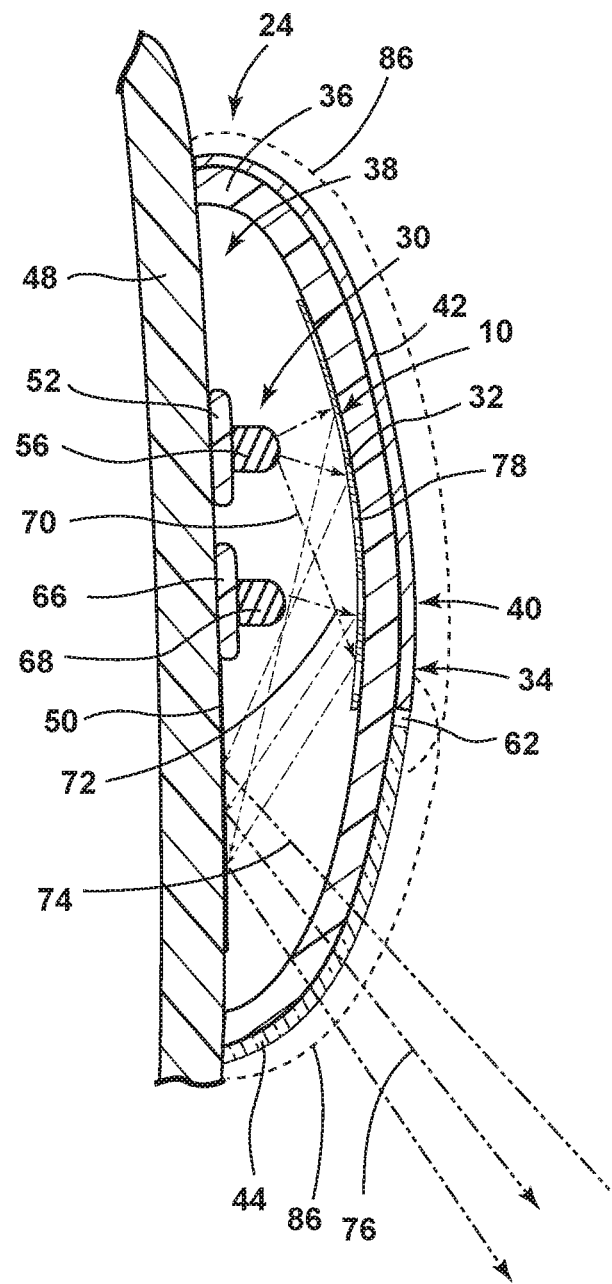
FIG. 5 illustrates a cross-sectional view of an alternate embodiment of a vehicle luminescent trim light assembly taken along line III-III of FIG. 2 having two light sources and a plurality of photoluminescent structures disposed therein.

Referring to FIG. 5, cross section of a trim light assembly 24 is shown having a first PCB 52 and first LED 56 disposed on an interior surface of a substrate 48. A second PCB 66 and second LED 68 are also disposed on the same surface. It is contemplated, however, that either PCB 52, 66 and/or LED 56, 68 may be disposed anywhere within or on any portion of the trim light assembly 24 to achieve any desired lighting effect. Additionally, both LEDs 56, 68 may be disposed on the same PCB 52. The first LED 56 is configured to emit light at a first wavelength 70. The second LED 68 emits light at a second wavelength 74 different from that of the first LED 56.

The trim light assembly 24 of FIG. 5 also includes first and second luminescent portions 32, 78 having two differing photoluminescent structures 10 therein. The first photoluminescent structure 10 is excited by light at the first wavelength 70, emitting light at a second wavelength 74. The second photoluminescent structure 10 is configured to be excited by light at the third wavelength 72 thereby emitting light at a fourth wavelength 76. Through the use of multiple light sources 56, 68 and multiple luminescent portions 32, 78, the trim light assembly 24 may produce a multitude of colored light and lighting effects.

Still referring to FIG. 5, the first and second luminescent portions 32, 78 are disposed on an interior surface of the housing 36 in an interlaced or striped pattern. Each luminescent portion 32, 78 may be disposed in any direction and of any practicable width to create the desired lighting effects. Through the use of a striped pattern, it is possible for the combined light emitted from the first and second luminescent portions 32, 78 to appear as a homogenous color. In another embodiment, the light source 30 may excite only the first luminescent portion 32 followed by only the second luminescent portion 78 in any desired pattern to create a desired lighting effect proximate the trim light assembly 24.

Additional luminescent portions may be interlaced on and/or within the housing 36 or may be disposed on a second surface within the cavity 38. The additional luminescent portions may be excited individually by any light source 30 or in combination with the first and second luminescent portions 32, 78 to create a wide range of colors and effects. For example, the light source 30 may rapidly excite alternating luminescent portions 32, 78 to create a flickering effect. Additionally, the light source 30 may vary the intensity of light emitted therefrom based on a predefined event, such as an output level chosen by an occupant through use of a switch, as described above. The intensity may also be varied based on any other data obtained from the vehicle 22, such as whether the vehicle 22 is being operated during the day or at night.

Figure 6:
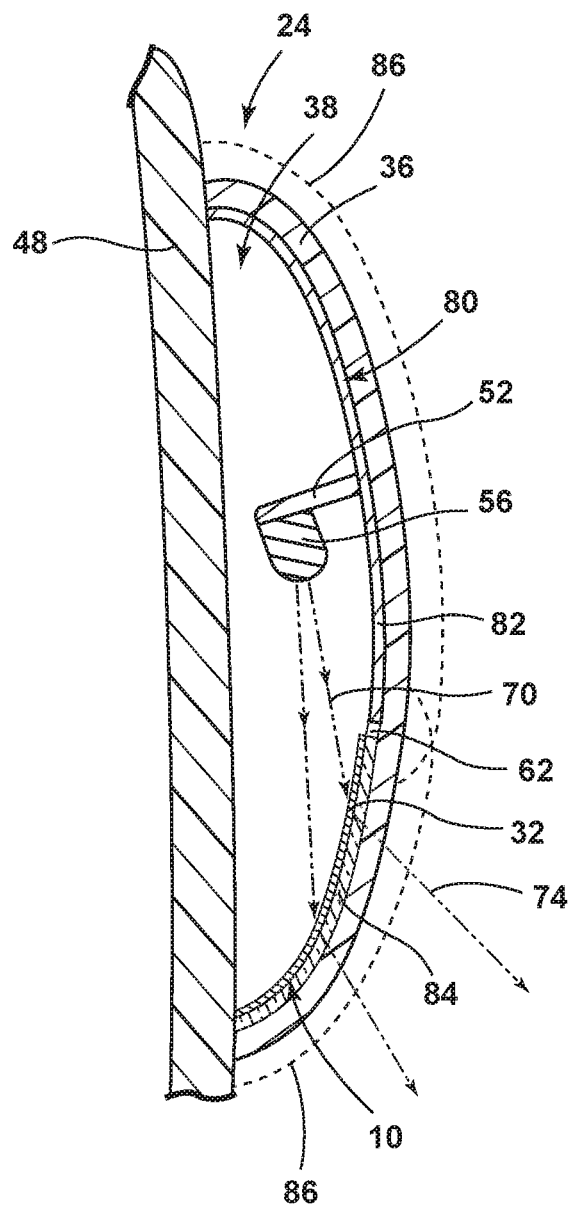
FIG. 6 illustrates a cross-sectional view of an alternate embodiment of a vehicle luminescent trim light assembly taken along line III-III of FIG. 2 having an inner layer disposed inwardly of the housing.

Referring to FIG. 6, an exemplary embodiment of a trim light assembly 24 is shown having a housing 36 coupled to a substrate 48 with an LED 56 and a PCB 52 disposed therebetween. An inner layer 80 having first and second portions 82, 84 is proximate the interior surface of the housing 36. The first portion 82 of the inner layer 80 is substantially opaque. A PCB 52 is coupled to the first portion 82 of the interior layer and an LED 56 is disposed on the PCB 52. The LED 56 is positioned towards a bottom portion of the housing 36. The second portion 84 of the inner layer 80 is substantially transparent and/or translucent such that light from within the housing 36 may be directed towards a desired location. Luminescent portion 32 containing a photoluminescent structure 10 is disposed on and/or within the second portion 84 of the inner layer 80 and configured to convert light at a first wavelength 70 from the LED 56 to a second wavelength 74, as described herein.

Still referring to FIG. 6, the first and/or second portions 82, 84 of the inner layer 80 may be conductive to form a sensor 34 and/or switch, as described above. The sensor 34 and/or switch may toggle the trim light assembly 24 between an on state and an off state or may control any other desired function, such as the intensity of the light. For example, when an operator touches the sensor 34 a variation of the electrostatic capacity of the sensor 34 and/or switch, which occurs due to the touch by the operator, is transferred through the first and/or second portion 82, 84 of the inner layer 80, thereby acting as a detection electrode to the controller 64 and then output as a touch operation signal. In addition, since the sensor 34 is formed with a conductive member and a portion thereof is made to appear as the housing 36, the touch detection can be made with high accuracy.

Referring to FIG. 7, an exemplary cross section III-III of FIG. 2 illustrates the trim light assembly 24 including a housing 36 and a substrate 48 having a PCB 52 formed integrally therewith. A light source 30, such as an LED 56, is disposed on the PCB 52. The LED 56 is directed towards the housing 36. In the illustrated embodiment, the housing 36 is substantially transparent and/or translucent. A photoluminescent structure 10 is disposed within and integrally formed with the housing 36.

The trim light assembly 24 includes an outer layer 40 having first and second portions 42, 44. In alternate embodiments, the outer layer 40 includes a plurality of portions that may each have differing levels of opacity. In the illustrated embodiment, the first portion 42 of the outer layer 40 is substantially opaque, while the second portion 44 of the outer layer 40 is substantially translucent. The second portion 44 of the outer layer 40 may additionally be formed as a lens thereby directing light excited by the photoluminescent structure 10 towards a desired location. Further, the lens may be an additional component that may be movable such that an occupant may control the target location of the trim light assembly 24. As described above, the first and/or second portions 42, 44 of the outer layer 40 may contain a conductive material thereby forming a proximity sensor 34 for controlling the trim light assembly 24.

Still referring to FIG. 7, the illustrated embodiment of the trim light assembly 24 further includes a protective layer 46 disposed on top of the outer layer 40. According to some examples, the protective layer 46 is made of a vacuum formed polycarbonate that has metal coatings applied to the interior surface thereof before injection molding of the housing 36 thereby creating the conductive part through cost effective means. It is contemplated, however, that any manufacturing process known in the art may be used to create the trim light assembly 24 and any component thereof. The protective layer 46 may comprise an additional design feature for the trim light assembly 24.

The protective layer 46 may be made through silk screening a material onto the housing 36. Alternatively, any other coating technique which allows the housing 36 and/or outer layer 40 to have any desired protective characteristics or design features may be utilized. The surface of the housing 36 and/or outer layer 40 may also be completely or selectively flashed with metal coatings for appearance, legends/markings, and/or conductivity.

In an alternate embodiment, first and second LEDs 56, 68 may be disposed on the same surface of the PCB 52. The first LED 56 may be directed towards a photoluminescent structure 10 within the trim light assembly 24. The second LED 68 may be disposed in a gullwing configuration, which emits light through the PCB 52. In such an embodiment, the second LED 68 may serve to illuminate any component disposed in the vicinity of the trim light assembly 24, such as a door latch. Additionally, or alternatively, the housing 36 of the trim light assembly 24 may be adapted to allow the light from the second LED 68 to pass therethrough to create additional lighting features within the vehicle 22.

Figure 8:
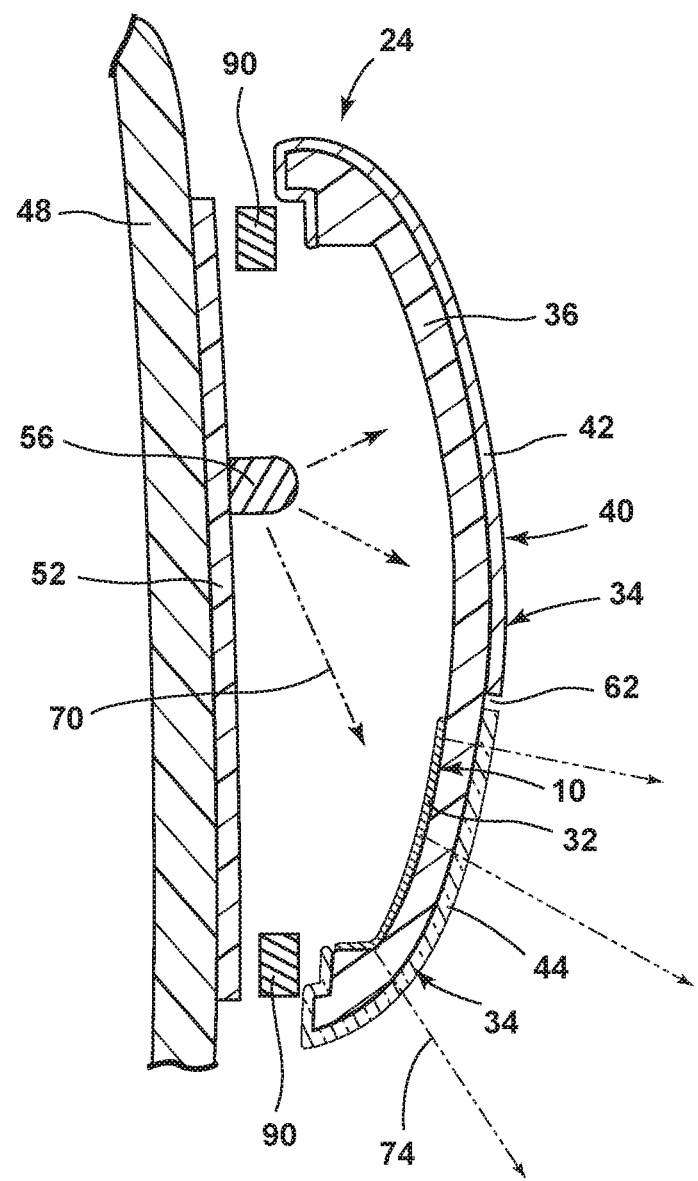
FIG. 8 illustrates an exploded cross-sectional view of an alternate embodiment of a vehicle having a luminescent trim light assembly taken along line III-III of FIG. 2 having an outer layer disposed on a housing and a protective material disposed on the outer layer.

Referring now to FIG. 8, an exemplary trim light assembly 24 is shown in an exploded view. The trim light assembly 24 includes a PCB 52 that may include spring connectors 90, or any other form of conductive compliant interconnects. The substrate 48 may form the base of the PCB 52, or alternatively, the PCB 52 may be attached to the substrate 48. The housing 36 may be curved in shape with a concave surface. The housing 36 may comprise a proximity sensor 34 to sense movement or an object approaching the trim light assembly 24.

The trim light assembly 24 may be resiliently movable to create a tactile feel as the trim light assembly 24 is actuated between different operating modes. The spring connectors 90 may be disposed between the substrate 48 and housing 36 to return the housing 36 to its original position. Signals from the sensor 34 may be routed to a central connector such as a zebra strip connector. Generally speaking, a zebra strip connector is a packaging device that allows quick alignment of electronic devices on a PCB 52. The zebra strip connector may comprise a small rubber strip with carbon bands extending around it that allows contact to be made from pads on the PCB 52 to the pads on a conductive outer layer 40 that partially surrounds the housing 36 by whichever bands happen to line up at both points.

The capacitive sensor pads may be deposited within a plurality of outer layer 40 portions. The capacitive sensor 34 may utilize a plurality of individual capacitive sensors arranged in various patterns designed to optimize the capacitive field 86 depending on the selected signal processing use. It is contemplated that any other type of proximity or push type sensor may alternatively or additionally be used within the trim light assembly 24.

The trim light assembly 24 of FIG. 8 also includes a light source 30, which may be controlled by the proximity sensor 34 disposed within the assembly. The light source 30, in the illustrated embodiment, is an LED 56 that emits light at a first wavelength 70. The trim light assembly 24 further includes a luminescent portion 32 disposed on or within the housing 36. The luminescent portion 32 is configured to emit light at a second wavelength 74 in response to receiving light at the first wavelength 70. The light at the second wavelength 74 is then directed outward from the trim light assembly 24 to provide light for an occupant within or proximate the vehicle 22.

Figure 9:
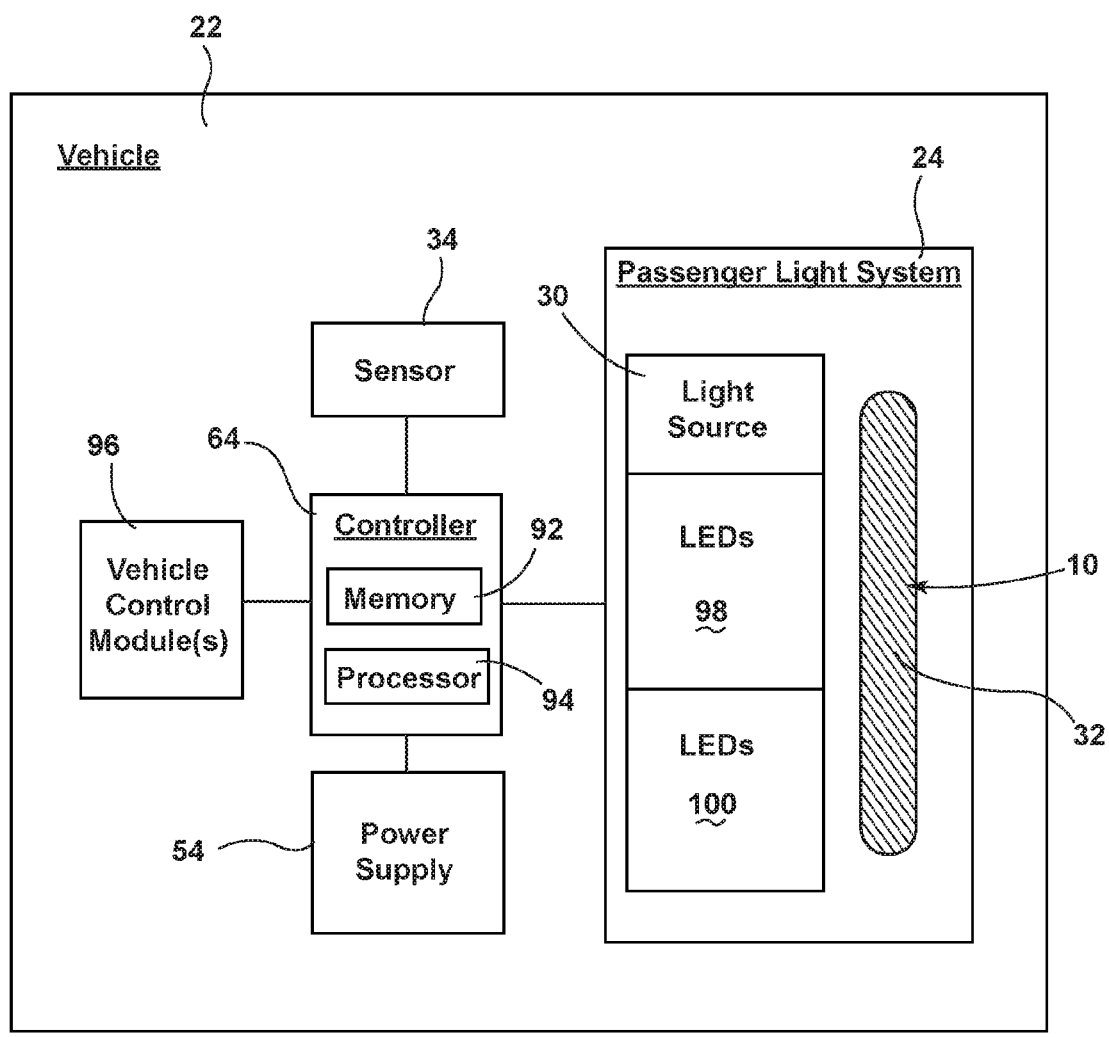
FIG. 9 is a block diagram of the vehicle lighting system.

Referring to FIG. 9, a box diagram of a vehicle 22 is shown in which a trim light assembly 24 is implemented. The trim light assembly 24 includes a controller 64 in communication with the light source 30. The controller 64 may be disposed on the PCB 52, within the assembly, or within the vehicle 22 and includes memory 92 having instructions contained therein that are executed by a processor 94 of the controller 64. The controller 64 may provide electrical power to the light source 30 via a power supply 54 located onboard the vehicle 22. In addition, the controller 64 may be configured to control the light output of each light source 30 based on feedback received from one or more vehicle control modules 96 such as, but not limited to, a body control module, engine control module, steering control module, brake control module, the like, or a combination thereof. Alternatively, the light output may be controlled by a switch disposed within the vehicle 22 and/or disposed within the trim light assembly 24. By controlling the light output of the light source 30, the luminescent portion 32 having a photoluminescent structure 10 therein may illuminate in a variety of colors and/or patterns to provide ambient light or useful vehicle information to an intended observer. For example, the illumination provided by the photoluminescent structure 10 may be used for numerous vehicle applications, such as, but not limited to, an occupant task light, a remote start indicator, a door lock indicator, a door ajar indicator, a puddle lamp when a vehicle door is placed in the open position, etc.

In operation, the photoluminescent structure 10 may exhibit a constant unicolor or multi-color illumination. For example, the controller 64 may control the light source 30 to emit only the first wavelength 70 of light via LEDs 98, 100 to cause the photoluminescent structure 10 to illuminate in the first color (e.g., white). Alternatively, the controller 64 may control the light source 30 to emit only a third wavelength of light 72 via LEDs 98, 100 to cause the photoluminescent structure 10 to illuminate in the second color (e.g., amber). Alternatively still, the controller 64 may control the light source 30 to simultaneously emit the first and third wavelengths of light 70, 72 to cause the photoluminescent structure 10 to illuminate in a third color (e.g. yellow) defined by an additive light mixture of the first and second colors. Moreover, additional photoluminescent structures 10 may be added to the trim light assembly 24 that converts the first and/or third emissions 70, 72 from the light source 30 to second and/or fourth emission 74, 76. The second and fourth emissions 74, 76 may be of any wavelength and may combine to form a substantially white light proximate the trim light assembly 24.

In another embodiment, the photoluminescent structure 10 may exhibit periodic unicolor or multi-color illumination. For example, the controller 64 may control the light source 30 to periodically emit only the first wavelength 70 of light via LEDs 98, 100 to cause the photoluminescent structure 10 to periodically illuminate in the first color. Alternatively, the controller 64 may control the light source 30 to periodically emit only the third wavelength of light 72 via LEDs 98, 100 to cause the photoluminescent structure 10 to periodically illuminate in the second color. Alternatively, the controller 64 may control the light source 30 to simultaneously and periodically emit the first and third wavelengths of light 70, 72 to cause the photoluminescent structure 10 to periodically illuminate in a third color defined by an additive light mixture of the first and second colors. Alternatively still, the controller 64 may control the light source 30 to alternate between periodically emitting the first and third wavelengths of light 70, 72 to cause the photoluminescent structure 10 to periodically illuminate by alternating between the first and second colors. The controller 64 may control the light source 30 to periodically emit the first and/or third wavelengths of light 70, 72 at a regular time interval and/or an irregular time interval.

With respect to the above examples, the controller 64 may modify the intensity of the emitted first and third wavelengths of light 70, 72 by pulse-width modulation or current control. In some embodiments, the controller 64 may be configured to adjust a color of the emitted light by sending control signals to adjust an intensity or energy output level of the light source 30. For example, if the light source 30 is configured to output the first emission at a low level, substantially all of the first emission may be converted to the second emission. In this configuration, a color of light corresponding to the second emission may correspond to the color of the emitted light from the luminescent trim light assembly 24. If the light source 30 is configured to output the first emission at a high level, only a portion of the first emission may be converted to the second emission. In this configuration, a color of light corresponding to a mixture of the first emission and the second emission may be output as the emitted light. In this way, each of the controllers 64 may control an output color of the emitted light.

Though a low level and a high level of intensity are discussed in reference to the first emission it shall be understood that the intensity of the first emission may be varied among a variety of intensity levels to adjust a hue of the color corresponding to the emitted light from the trim light assembly 24. As described herein, the color of the second emission may be significantly dependent on the particular photoluminescent materials utilized in the photoluminescent structure 10. Additionally, a conversion capacity of the photoluminescent structure 10 may be significantly dependent on a concentration of the photoluminescent materials utilized in the photoluminescent structure 10. By adjusting the range of intensities that may be output from the light source 30, the concentration and proportions of the photoluminescent structures 10 in the luminescent portion 32 and the types of photoluminescent materials utilized in the luminescent portion 32, the lighting devices discussed herein may be operable to generate a range of color hues of the emitted light by blending the first emission 70 with the second emission 74.

Accordingly, a trim light assembly employing one or more photoluminescent structures configured to convert light received from an associated light source and re-emit the light at a different wavelength has been advantageously described herein. The trim light assembly may provide various benefits including a simple and cost-effective means to produce a variety of illumination that may be used as a styling feature and/or to inform an intended user of a particular vehicle status.

According to various examples, a trim assembly for a vehicle is provided herein. The trim assembly includes a substrate and a housing forming a cavity therebetween. A conductive layer is coupled to the housing and has first and second portions each including an electrically conductive material. The first portion is separated from the second portion by an electrically insulative gap. Examples of the trim assembly can include any one or a combination of the following features:
 the substrate is coupled to a vehicle door trim panel;
 a light source within the cavity;
 the conductive material is configured as a proximity sensor that is operably coupled to a controller to actuate a control output;

the gap is a hollow void;

the gap is filled with an electrically insulative material;

a protective layer disposed outwardly of the housing;

the proximity sensor is configured as a capacitive sensor that detects changes in capacitance due to movement of an object proximate to or in contact with the proximity sensor;

a conductive interconnect disposed between a substrate and the housing, wherein the interconnect supplies electrical power to each conductive material on the housing;

the first and second portions of the conductive layer are disposed on first and second opposing surfaces of the housing, the second surface aligned with the conductive interconnect; and/or the housing is resiliently movable relative to the substrate Moreover, a method of manufacturing trim assembly for a vehicle is provided herein. The method includes attaching a substrate to a housing forming a cavity therebetween. Next, a conductive layer is coupled to the housing. The conductive layer has first and second portions each including an electrically conductive material. The first portion is separated from the second portion by an electrically insulative gap.

According to some examples, a trim assembly for a vehicle is provided herein. The assembly includes a housing having a layer thereon having first and second portions each formed with an electrically conductive material and separated by an electrically insulative gap. A conductive interconnect is disposed between a substrate and the housing. The interconnect supplies electrical power to each conductive material on the housing. A light source is disposed between the substrate and housing. Examples of the trim assembly can include any one or a combination of the following features:

the first and second portions of the conductive material are disposed on first and second opposing surfaces of the housing, the second surface aligned with the conductive interconnect;

the housing is resiliently movable relative to the substrate; and/or the conductive material is configured as a proximity sensor that is operably coupled to a controller to actuate a control output.

According to some examples, a trim assembly for a vehicle is provided herein. The trim assembly includes a substrate coupled to a housing. The housing has a conductive layer thereon that includes first and second portions separated by an electrically insulative gap. A conductive interconnect is disposed between the substrate and the housing. The interconnect supplies electrical power to the conductive layer on the housing. Examples of the trim assembly can include any one or a combination of the following features:

a light source within a cavity defined between the substrate and the housing;

the first and second portions of the conductive layer are disposed on first and second opposing surfaces of the housing, the second surface aligned with the conductive interconnect;

the first or second portions of the conductive layer is configured as a proximity sensor that is operably coupled to a controller to actuate a control output; and/or wherein the housing is resiliently movable relative to the substrate.

It will be understood by one having ordinary skill in the art that construction of the described invention and other components is not limited to any specific material. Other exemplary embodiments of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A trim assembly for a vehicle comprising:
   a substrate and a housing forming a cavity therebetween; and
   a conductive layer coupled to the housing and having first and second portions each including an electrically conductive material, the first portion separated from the second portion by an electrically insulative gap.

2. The trim assembly of claim 1, wherein the substrate is coupled to a vehicle door trim panel.

3. The trim assembly of claim 1, further comprising:
   a light source within the cavity.

4. The trim assembly of claim 1, wherein the conductive material is configured as a proximity sensor that is operably coupled to a controller to actuate a control output.

5. The trim assembly of claim 4, wherein the proximity sensor is configured as a capacitive sensor that detects changes in capacitance due to movement of an object proximate to or in contact with the proximity sensor.

6. The trim assembly of claim 1, wherein the gap is a hollow void.

7. The trim assembly of claim 1, wherein the gap is filled with an electrically insulative material.

8. The trim assembly of claim 1, further comprising:
a protective layer disposed outwardly of the housing.

9. The trim assembly of claim 1, further comprising:
a conductive interconnect disposed between a substrate and the housing, wherein the interconnect supplies electrical power to each conductive material on the housing.

10. The trim assembly of claim 9, wherein the first and second portions of the conductive layer are disposed on first and second opposing surfaces of the housing, the second surface aligned with the conductive interconnect.

11. The trim assembly of claim 9, wherein the housing is resiliently movable relative to the substrate.

12. A trim assembly for a vehicle, the assembly comprising:
a housing having a layer thereon having first and second portions each formed with an electrically conductive material and separated by an electrically insulative gap;
a conductive interconnect disposed between a substrate and the housing, wherein the interconnect supplies electrical power to each conductive material on the housing; and
a light source disposed between the substrate and housing.

13. The trim assembly of claim 12, wherein the first and second portions of the conductive material are disposed on first and second opposing surfaces of the housing, the second surface aligned with the conductive interconnect.

14. The trim assembly of claim 12, wherein the housing is resiliently movable relative to the substrate.

15. The trim assembly of claim 12, wherein the conductive material is configured as a proximity sensor that is operably coupled to a controller to actuate a control output.

16. A trim assembly for a vehicle, the assembly comprising:
a substrate coupled to a housing, the housing having a conductive layer thereon including first and second portions separated by an electrically insulative gap; and
a conductive interconnect disposed between the substrate and the housing, wherein the interconnect supplies electrical power to the conductive layer on the housing.

17. The trim assembly of claim 16, further comprising:
a light source within a cavity defined between the substrate and the housing.

18. The trim assembly of claim 16, wherein the first and second portions of the conductive layer are disposed on first and second opposing surfaces of the housing, the second surface aligned with the conductive interconnect.

19. The trim assembly of claim 16, wherein the first or second portions of the conductive layer is configured as a proximity sensor that is operably coupled to a controller to actuate a control output.

20. The trim assembly of claim 16, wherein the housing is resiliently movable relative to the substrate.

* * * * *